Sept. 22, 1970 R. W. REDINGTON 3,530,237

DEFLECTION SCANNING SYSTEM

Filed June 1, 1967 4 Sheets-Sheet 1

Inventor:
Rowland W. Redington,
by John J. Kissane
His Attorney.

Inventor:
Rowland W. Redington,
by John J. Kissane
His Attorney.

Sept. 22, 1970 R. W. REDINGTON 3,530,237

DEFLECTION SCANNING SYSTEM

Filed June 1, 1967 4 Sheets-Sheet 3

Inventor:
Rowland W. Redington
by John J. Kissane
His Attorney.

Sept. 22, 1970 R. W. REDINGTON 3,530,237

DEFLECTION SCANNING SYSTEM

Filed June 1, 1967 4 Sheets-Sheet 4

1ST SCAN OF CAMERA

VIDEO SIGNAL

2ND SCAN

3RD SCAN

Inventor:
Rowland W. Redington,
by John J. Kissane
His Attorney.

3,530,237
Patented Sept. 22, 1970

3,530,237
DEFLECTION SCANNING SYSTEM

Rowland W. Redington, Schenectady, N.Y., assignor to General Electric Company, a corporation of New York
Filed June 1, 1967, Ser. No. 642,914
Int. Cl. H04n 3/16
U.S. Cl. 178—7.2 6 Claims

ABSTRACT OF THE DISCLOSURE

Dissipation of a signal from a point image over several scan lines is eliminated by a feedback circuit connected between the output terminal of a vidicon target electrode and the vertical deflection plates of the vidicon. When the skirts of the low velocity electron beam traversing the target electrode initially produce an output voltage above a predetermined level, as fixed by a threshold detector, a pulse generator is actuated to produce a rectangular pulse which pulse is capacitively coupled to the vertical deflection plates of the vidicon. The magnitude, rise time and duration of the rectangular pulse is set relative to both the sensing periphery of the electron beam and the scane rate to vertically deflect the centroid of the beam over the point image producing the detected output signal. The electron beam can be deflected for a portion of the line scan wherein the output signal was originally detected or the entire scan line succeeding the originally detecting scan line can be deflected to pass the scanning electron beam directly over the detected point image. The exact location of point images can be determined by storing output signal information from a scanned frame and utilizing the stored information to selectively scan individual lines in succeeding frames at locations corresponding to the detected locations of point images observed during the scan of the intial frame.

Figure 1:
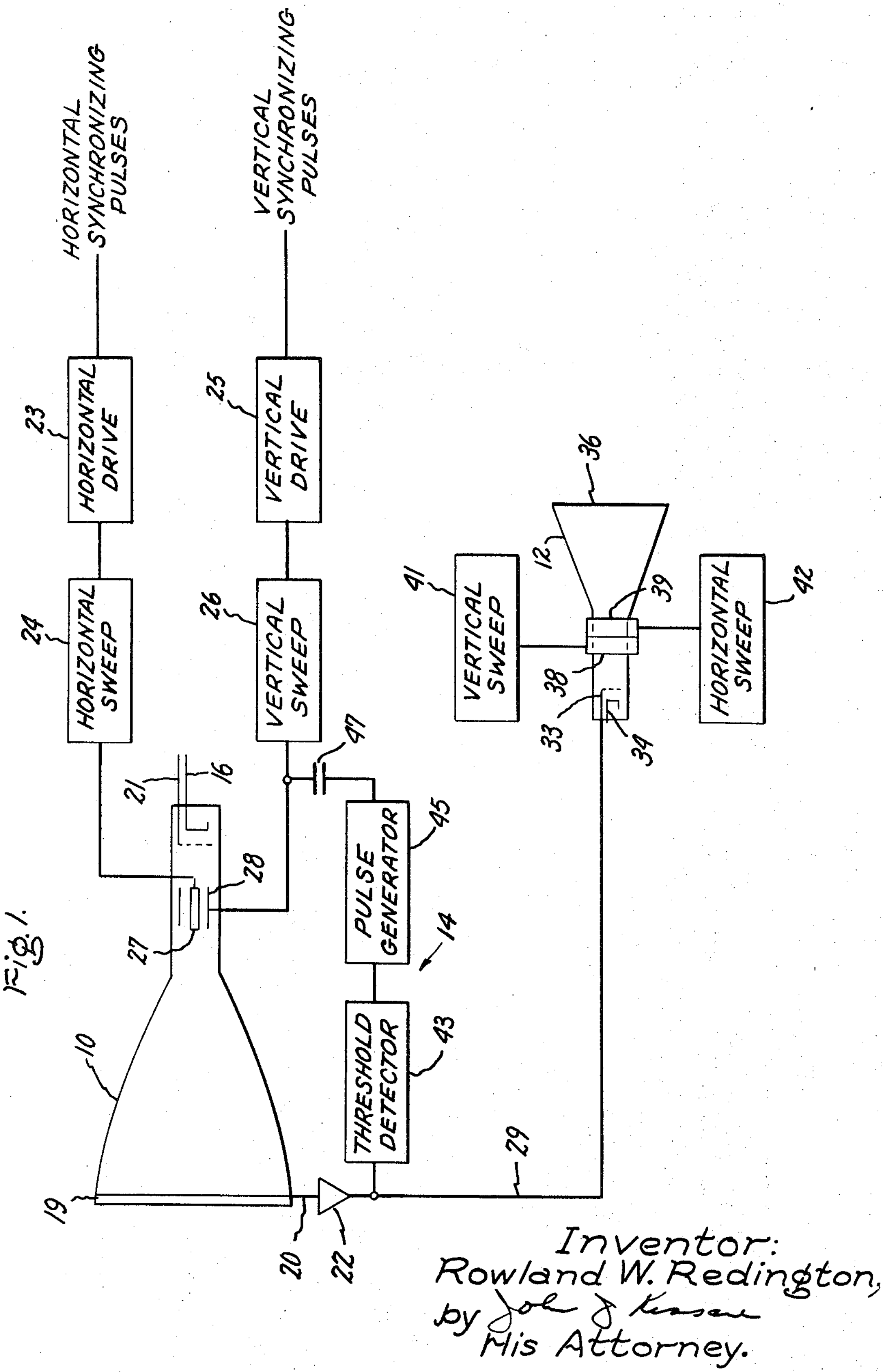

The invention herein described was made in the course of or under a contract or subcontract thereunder with the Department of the Army.

This invention relates to a television scanning system and in particular to a television scanning system wherein the scan pattern of a low velocity electron beam in a camera tube is altered to pass the centroid of the beam directly over a detected point image.

In almost all commonly utilized camera tubes, a low velocity electron beam is scanned across a target electrode to charge the scanned surface down to cathode potential and to produce an output signal corresponding to the luminance of an image formed upon the face of the target electrode at the point of impingement of the scanning electron beam. The low energy deposition of the electrons as the scan surface approaches cathode potential, the smearing of the electron beam on the photoconductive layer or storage medium of the target electrode and aberrations in the electron optics combine to produce a relatively large effective diameter of the electron beam upon the target electrode, e.g. an electron beam diameter of $10^{-4}$ cm.$^2$ is typical for most electrostatically controlled camera tubes. The wide skirts of the large diameter beam cause the signal from a point image to appear on several scan lines resulting in inferior vertical resolution in the video display of the point image. The spread of a point image over several scan lines is an especially acute problem in military tracking systems wherein the exact location of point images upon a display screen is required to accurately determine the coordinates of the tracked object. Furthermore because the obtainable magnitude of the signal from a point image also is dissipated over several scan lines, the peak power from the point image is reduced and the minimum detectable point power is raised.

It is therefore an object of this invention to provide a low velocity electron beam scanning system capable of producing high quality vertical resolution.

It is also an object of this invention to provide a low velocity electron beam scanning system wherein the magnitude of the output signal from a point image is maximized.

It is a further object of this invention to provide a low velocity electron beam scanning system wherein the scan line location of a point image can be ascertained with certainty.

These and other objects of this invention generally are achieved in a television scanning system wherein an output signal is produced by the scan of an electron beam in a line pattern across a target electrode to charge down the target electrode to cathode potential by the inclusion of means for detecting the quantity of electrostatic charge absorbed from the electron beam by the target electrode and means responsive to observance of electrostatic charge absorption above a predetermined magnitude by the detecting means to alter the scan pattern of the electron beam. Thus the television scanning system of this invention generally includes a camera tube having a target electrode, means for generating an electron beam and for directing the electron beam upon the target electrode, the target electrode absorbing charge from the electron beam and producing an output signal proportional to the luminance of an image formed upon the target electrode at the point of impingement of the electron beam, means for scanning the electron beam in a line pattern across the target electrode, means for detecting the output signal from the target electrode and means responsive to detection of an output signal above a predetermined magnitude to alter the scan pattern of the electron beam thereby passing the centroid of the beam over the image producing the detected output signal.

In one general embodiment of this scanning system, the means for altering the scan pattern produces a deflection of the electron beam from a normal scan pattern in an angular direction relative to the direction of the electron beam line scan. Thus the beam can be deflected either during the traversal of a scan line whereby only a portion of the scan line is deflected from a normal scan pattern or the beam can be deflected at the initiation of a scan line with the beam preferably being deflected for the period of a complete scan line.

In a second embodiment of this invention, the detected locations of point images during the scan of a frame are stored and succeeding frames are scanned only along those lines wherein a point image was detected during the initial scan. Frame information storage and selective scanning permits the scan line location of a point image to be ascertained with certainty.

The features of the invention believed to be novel are set forth with particularly in the appended claims. The invention itself, however, both as to organization and method of operation, together with further objects and advantages thereof, may best be understood by reference to the following description taken in conjunction with the accompanying drawings in which:

FIG. 1 is a block diagram of the television scanning system of this invention.

Figures 2A, 2B, 2C, 2D, 2E, 2F:
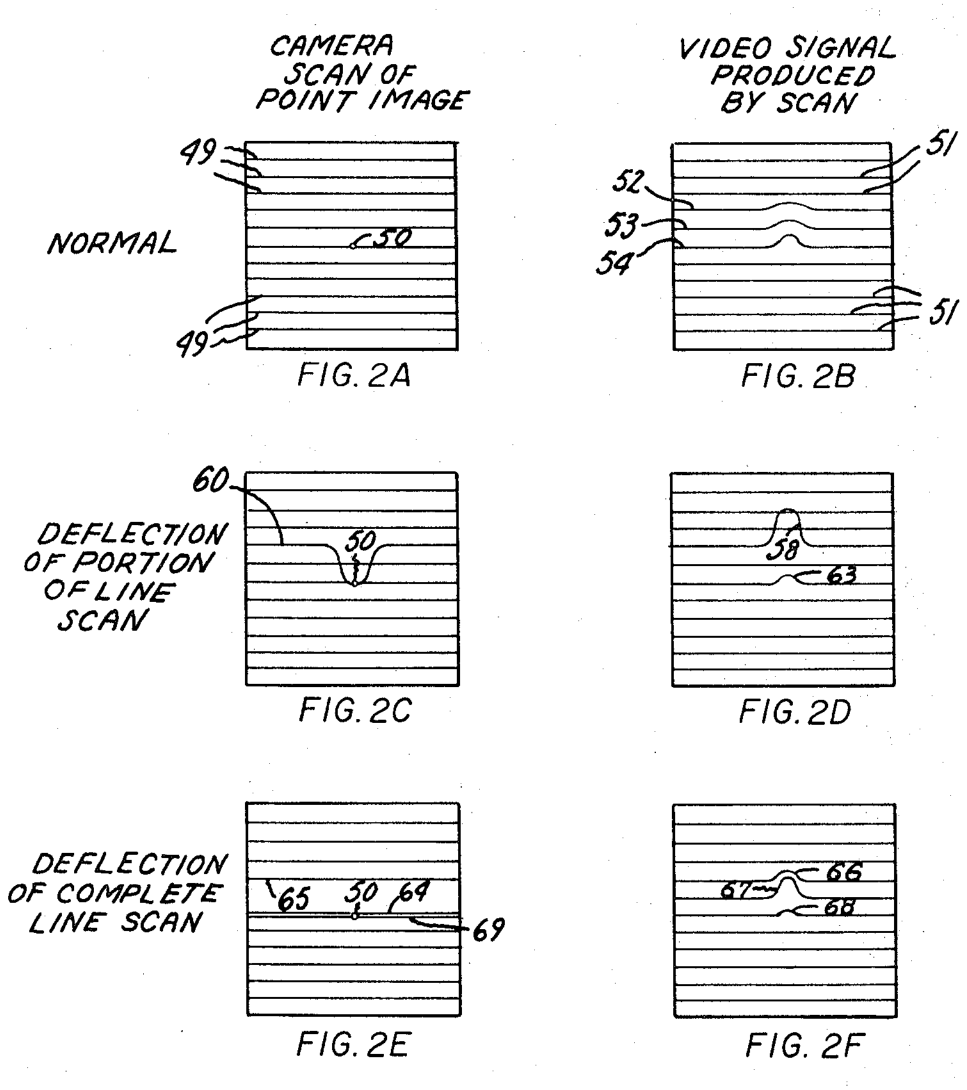
Figure 3:
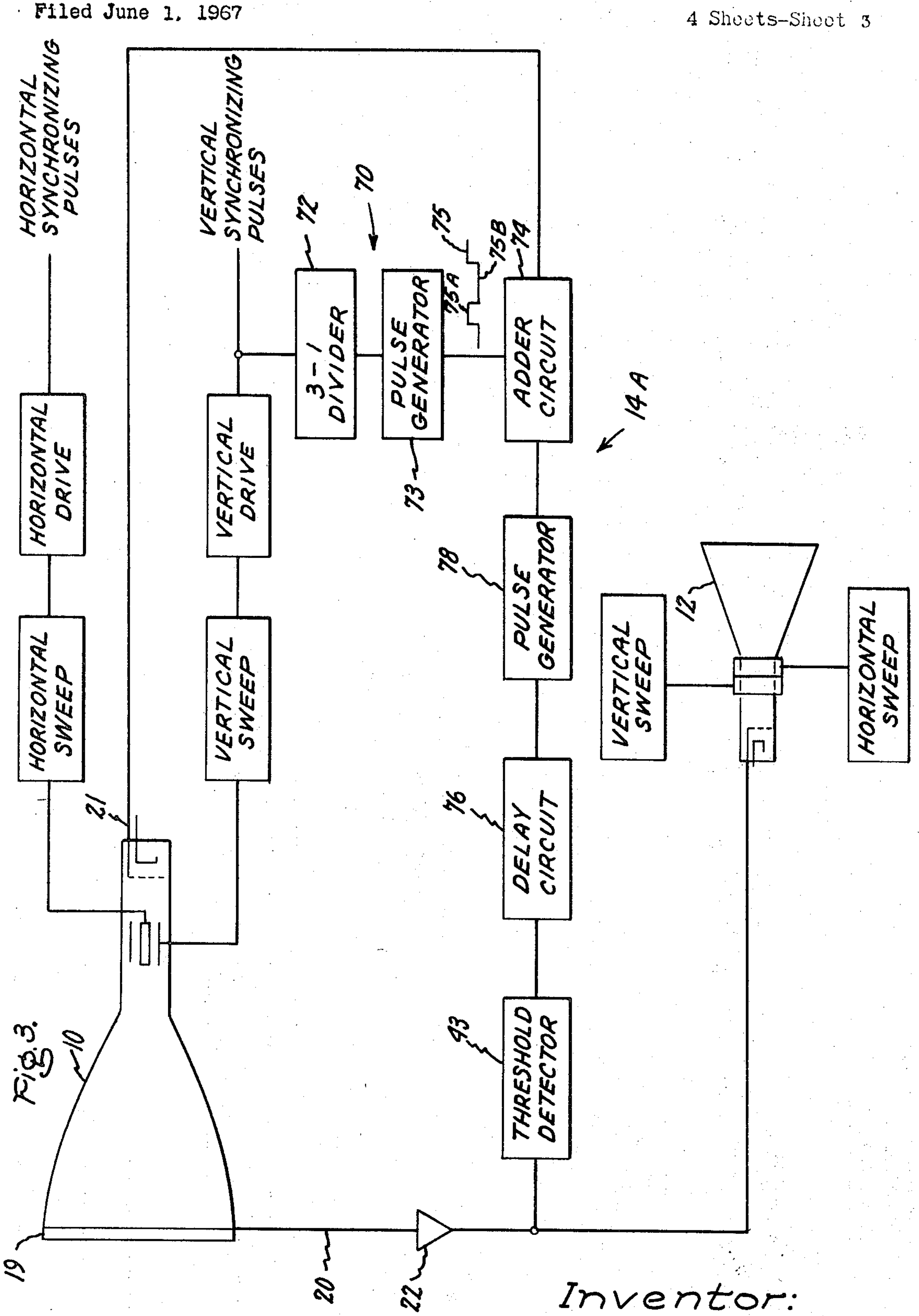

FIGS. 2*a–f* is a portrayal of the video signals produced by various camera scans of a point image, FIG. 3 is a block diagram of a television scanning system of this invention wherein the detected point images in a first scanned frame are utilized to control the selective scanning of a second frame, and FIGS. 4*a–f* is a portrayal of various video signals and camera scans utilizing the television scanning system of FIG. 3.

The television scanning system of this invention, as depicted in FIG. 1, generally includes a camera tube 10 of the type employing a low velocity electron beam scan to produce an output signal, a cathode ray tube 12 for displaying images detected by a scan of the front face of camera tube 10, and a feedback circuit, generally identified by reference numeral 14, to sense the output signals from the camera tube 10 and produce a voltage signal to alter the vertical deflection of the camera tube upon the sensing of an output signal from the camera tube above a predetermined value.

Camera tube 10 is portrayed specifically as a vidicon tube having a cathode 16 for the production of an electron beam which beam is traversed in a regular scan pattern across a copper doped germanium target electrode 19. Target electrode 19 generally forms the front face of the camera tube and may be a target electrode of the type produced in accordance with the teachings of my copending application Ser. No. 477,613, now Pat. No. 3,401,107 entitled "Method of Manufacturing Semiconductor Camera Tube Targets," which application is assigned to the assignee of the present invention. A control grid 21 is positioned within the neck of camera tube 10 proximate cathode 16 and functions to control the intensity of the low velocity beam generated by the cathode.

The sweep pattern of the low velocity electron beam across the copper doped germanium target electrode generally is controlled in a conventional manner by the horizontal and vertical synchronizing pulses in the camera tube circuitry. The horizontal synchronizing pulses are applied to a horizontal drive circuit 23 to produce output voltage signals which are fed to a horizontal sweep circuit 24 to generate a sawtooth waveform from the horizontal sweep circuit. Similarly the vertical synchronizing pulses are applied to a vertical drive circuit 25 to produce output voltage signals which signals are fed to a vertical sweep circuit 26 to generate a sawtooth waveform from the horizontal sweep circuit. The outputs from horizontal sweep circuit 24 and vertical sweep circuit 26 are connected to horizontal deflection plates 27 and vertical deflection plates 28, respectively, situated within the neck of camera tube 10. For normal television scan rates, horizontal sweep circuit 24 produces a sweep frequency of approximately 15.75 kilocycles/sec. while vertical sweep circuit 26 is of a frequency sufficient to produce 525 lines per frame, e.g. 60 cycles/sec. when interlacing is employed in the scan pattern.

In the operation of camera tube 10, the electron beam produced by cathode 16 is scanned in a regular line pattern, as determined by the generated waveforms from horizontal sweep circuit 24 and vertical sweep circuit 26, across copper doped germanium target electrode 19. Upon the detection of a point image situated on the target electrode within the sensing periphery of the scanning low velocity electron beam, a voltage proportional to the luminance of the point image is produced by target electrode 19 and the voltage from the target electrode is fed through lead 20 to an amplifier 22 wherein the voltage is raised to a conveniently utilizable magnitude. Although camera tube 10 has been described as being a vidicon tube, any camera tube, e.g. an orthicon tube, utilizing a low velocity electron beam to charge a scanned surface down to cathode potential may be used in the television scanning system of this invention.

The amplified output voltage produced by the scan of the electron beam across target electrode 19 is fed through external lead 29 to the control grid 33 of a conventional cathode ray tube 12 to regulate the intensity of the electron beam which beam is generated by cathode 34 and traversed across the phosphor coated front face 36 of the cathode ray tube to display the image detected by a scan of target electrode 19 of camera tube 10. The vertical and horizontal deflection of the electron beam generated in cathode ray tube 12 is controlled by vertical and horizontal magnetic yokes 38 and 39, respectively, mounted upon the neck of cathode ray tube 12. A vertical sweep circuit 41 having a frequency equal to the sweep frequency of vertical sweep circuit 26 is connected to the vertical magnetic yoke and a horizontal sweep circuit 42 having a frequency equal to the sweep frequency of horizontal sweep circuit 24 is connected to the horizontal magnetic yoke with synchronism between the scan patterns of camera tube 10 and cathode ray tube 12 being achieved in a conventional manner e.g. by the transmission of synchronizing signals from camera tube 10.

The magnitude of the amplified output voltage from target electrode 19 is detected by a threshold detector 43, such as a biased diode, which detector produces an output voltage when the voltage signal generated by camera tube 10 exceeds a minimal predetermined value slightly greater than minor noise. The output voltage from threshold detector 43 is fed as an actuating signal to pulse generator 45 to produce a rectangular pulse output which is coupled through capacitor 47 to the vertical deflection plates 28 of camera tube 10.

The operation of feedback circuit 14 can best be understood by reference to FIG. 2, wherein the video signals produced by a point image for various camera scans is depicted. A normal low velocity electron beam scan frame of camera tube 10, e.g. a scan frame without the utilization of feedback circuit 14, is depicted in FIG. 2A and consists of a regular pattern of vertically displaced horizontal scan lines 49 employed for the detection of a point image generally identified by reference numeral 50. The output signal from camera tube 10 used as the video signal for cathode ray tube 12 is depicted in FIG. 2B and generally consists of a pattern of voltage lines 51 corresponding to each horizontal scan line of the electron beam in camera tube 10. Because of the generally large diameter of the electrostatically controlled electron beam scanning target electrode 19, e.g. approximately $10^{-4}$ cm.$^2$, and because of the ability of an electron beam to peripherally sense the location of a point image before actually passing over the point image, e.g. an electron beam having a diameter of approximately 1 mil can detect a point image located approximately 2 mils from centroid of the beam, a video signal is observable commencing with line 52 when the skirts of the scanning camera beam first detect point image 50 and continuing over lines 53 and 54 until the point image has been completely charged down to cathode potential. Thus the location of point image 50 is spread over approximately three successive video signal lines thereby diminishing the intensity of the signal and reducing the resolution of the cathode ray tube display.

To enhance the output signal and to increase the vertical resolution of point image 50, feedback circuitry 14 is employed to vertically deflect the electron beam scanning target electrode 19 as depicted in FIG. 2C. The video signal produced by the camera scan of FIG. 2C is portrayed in FIG. 2D. Since the effective peripheral sensing area of the camera tube electron beam is approximately a radial distance of two successive scan line spacings from the centroid of the beam, a video signal 58 initially appears during the camera scan of a line 60 situated approximately two successive scan lines above the geometrical location of point image 50. The initial rise in video signal 58 is indicative of the presence of point image 50 at a location below and to the right of the centroid of the camera beam with the distance from the centroid of the camera beam to point image 50 being approximately equal to the peripheral sensing radius of the camera electron beam.

The initial presence of video signal 58 is sensed by threshold detector 43 which detector preferably is set at a low threshold level, e.g. approximately two or three times the magnitude of the noise level, to assure detection of all signals having a magnitude greater than minor interference signals. The detected portion of video signal 58 actuates pulse generator 45 to produce a rectangular pulse which pulse is capacitively coupled to vertical deflection plates 28 to vertically deflect the electron beam tracing scan line 60 by a distance approximately equal to the peripheral sensing radius of the electron beam e.g. two successive scan lines, thereby passing the centroid of the beam over point image 50 during the scan line 60 in which the point image is initially detected. Passage of the centroid of the electron beam directly over point image 50 charges down the point image approximately to cathode potential on the first traversal and a video signal 58 of relatively large magnitude is produced. Because the first pass charged down the point image to approximately cathode potential, the successive scans of the electron beam produce only minor ripples in the video signal as exemplified by video signal 63.

In one specific instance utilizing a one inch diagonal camera tube with a horizontal sweep frequency of 15.75 kilocycles/sec. and a vertical sweep frequency of 60 cycles/sec., a rectangular pulse having a rise time of approximately 100 ns. and a pulse length in the 200–300 ns. range was found sufficient to deflect the centroid of a $10^{-4}$ $cm.^2$ electron beam over a point image during the line scan wherein the point image was initially detected. Because the delay produced by threshold detector 43 is minimal and generally can be neglected in determining the shape of the deflection pulse to be produced by pulse generator 45, the permissive rise time for each individual circuit application generally will depend only upon the horizontal scan period and the peripheral sensing area of the scanning electron beam. The magnitude of the pulse produced by pulse generator 45 preferably is between 3 to 10 volts dependent upon the amount of vertical decection required to pass the centroid of the scanning beam over the point image upon an initial sensing of the point image by the beam.

The deflection of the scanning electron beam from a normal scan pattern also can utilize a slower time basis if desired. In FIGS. 2E and 2F there is respectively depicted the camera scan pattern and the video signal produced when the camera scan pattern is deflected on a line-to-line basis. Thus the camera scan line 64, immediately following the camera scan line 65 producing a video signal 66 in excess of the threshold voltage, is deflected downwardly by a fixed number of scan lines, e.g. one, thereby passing scan line 64 directly over the point image. The passage of the centroid of the beam over point image 50 results in an almost complete charging down of the point image and a relatively high video signal 67 is produced. After the deflection of single scan line 64 following the initial observance of the point image by scan line 65, the scan pattern preferably returns to a normal pattern. Thus point image 50 is scanned twice and the normal scan line immediately following line 65 is not scanned. The almost complete charging down of point image 50 by deflection scan 66, however, results in only a minor video signal 68 being observed during the second scan 69 of the point image. To assure only one deflected line scan per point image, a timing circuit (not shown) such as a multivibrator can be inserted in feedback circuit 14A to block pulses from threshold detector 43 for a fixed period, e.g. 1.5 scan lines, following the initial detection of the point image. Although in the scan patterns depicted in FIG. 2E, a deflection of only a single scan line was required to pass scan line 66 over point image 50, a deflection of a greater or lesser number of scan lines may be necessary dependent upon the peripheral sensing range of the electron beam scanning the target electrode.

In the operation of the line-to-line deflection scanning of FIGS. 2E and 2F, an amplified video signal from camera tube 10 above the voltage detectable by threshold detector 43 permits an actuating signal to be fed to pulse generator 45 whereupon the pulse generator produces a rectangular pulse which is capacitively coupled to the vertical deflection plates 28 of camera tube 10. Preferably a variable delay circuit (not shown) is inserted between pulse generator 45 and vertical deflection plates 27 to assure that the application of the rectangular pulse to the vertical deflection plates 27 occurs at the initiation of the horizontal scan succeeding the initial detection of point image 50. By synchronizing the delay period of the variable delay circuit with the output signal of horizontal oscillator 24, the application of the pulse produced by pulse generator 45 to the vertical deflection plates simultaneously with the initiation of the succeeding horizontal scan is assured.

The exact location of a point image upon a video screen can be determined by a modification of the scan pattern on a frame-to-frame basis as depicted utilizing the television scanning system of FIG. 3, which system is described hereinafter as having a non-interlaced scan pattern for purposes of clarity of disclosure. Because the only other variations between the scanning system of FIG. 3 and the scanning system of FIG. 1 reside in feedback circuitry 14A and electron beam blanking circuit 70, identical reference numerals are utilized to identify identical elements in both figures.

Electron beam blanking circuit 70 functions to suppress the electron beam of camera tube 10 during the selective scanning frames of target 19 and generally includes a 3 to 1 divider circuit 72, a pulse generator 73, and an adder circuit 74. The vertical synchronizing pulses employed to actuate vertical drive circuit 25 of camera tube 10 are fed to 3 to 1 divider circuit 72 to produce a single triggering signal for pulse generator 73 every three vertical frames scanned by camera tube 10. Upon receipt of the triggering signal from divider circuit 72, pulse generator 73 produces a rectangular waveform 75 exhibiting a normal biasing potential 75A for camera tube 10 for a period of a single frame of the camera tube and exhibiting a succeeding grid cutoff potential 75B for camera tube 10 for a period of two frames of the camera tube. The rectangular waveform from pulse generator 73 is applied through adder circuit 74 to the grid 21 of camera tube 10 to permit a first complete scan of target 19 during the normal biasing portion of waveform 75 and to suppress the electron beam of the camera tube for two successive frames following the complete scan, e.g. during the grid cutoff portion of waveform 75.

To permit selective scanning during the period when electron beam blanking circuit 70 is applying the grid cutoff portion of rectangular waveform 75 to grid 21 of camera tube 10, feedback circuitry 14A is utilized to produce positive going pulses at selected intervals thereby cancelling the cutoff biasing on grid 21 for limited periods of approximately one scan line. To effectuate this result, the amplified output voltage from target electrode 19 is sensed by threshold detector 43 and an output pulse is generated by the detector upon sensing a voltage above a predetermined magnitude. The output of threshold detector 43 is fed through a delay circuit 76 having a delay interval approximately equal to the interval required for the scan of a single frame plus one line of camera tube 10 to actuate pulse generator 78 thereby producing a positive going output pulse from pulse generator 78 having a magnitude approximately equal to the step in rectangular waveform 75. The output pulse from pulse generator 78 has a period approximately equal to the horizontal scan line period and is applied to adder circuit 74 to be summed with waveform 75 from pulse generator 73 to provide a period of normal biasing for grid 21 during the grid cutoff portion of waveform 75. Thus the electron beam from cathode 16 sweeps target electrode 19 only during the positive going portion of waveform 75 and at those intervals when a positive pulse is generated by pulse generator 78 during the negative going portion of waveform 75.

Figure 4A:
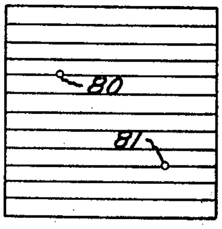
Figure 4B:
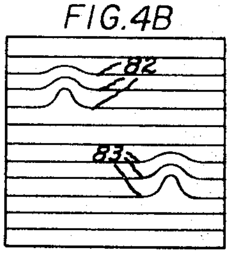

To specifically locate point images 80 and 81, the normal biasing portion 75A of rectangular waveform 75 initially is applied to grid 21 of camera tube 10 and the electron beam generated by cathode 16 is traversed across target electrode 19 in a regular scan pattern, as depicted in FIG. 4A, thereby producing a video pattern portrayed in FIG. 4B. The video pattern produced by the regular scan pattern exhibits two three scan line clusters of detectable video signals 82 and 83 corresponding to point images 80 and 81, respectively, because of the wide sensing periphery of the low velocity beam. Although the number of scan lines per cluster of detectable video signals generally is variable being dependent upon the sensing periphery of the beam and the spacing between scan lines, three scan lines per cluster is chosen as a convenient number for descriptive purposes. At the end of a scan of a complete frame of camera tube 10, grid cutoff portion 75B of rectangular waveform 75 is applied through adder circuit 74 to the grid 21 of camera tube 10 tending to suppress further generation of an electron beam by cathode 16 for two successive frames.

Amplified video signals 82 and 83 corresponding to the locations of point images 80 and 81 are sensed by threshold detector 43 and are fed to pulse generator 78 after a delay in delay circuit 76 equal to the time interval required to scan a single frame plus a single line. The positive going pulse produced by pulse generator 78 upon receipt of a triggering output pulse from delay circuit 76 is summed with waveform 75 in adder circuit 74 to produce a normal biasing potential to grid 21 for the interval corresponding to the pulse width of the output pulse produced by pulse generator 78, e.g. approximately the period of one scan line.

Figure 4C:
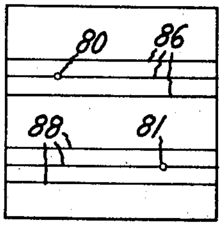
Figure 4D:
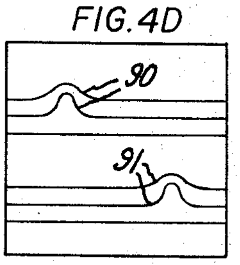
Figure 4E:
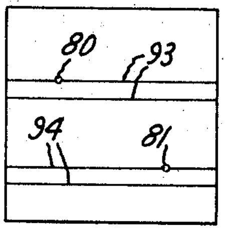
Figure 4F:
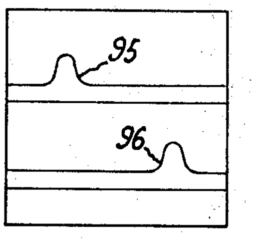

Upon application of the normal biasing potential to grid 21, the electron beam produced by cathode 16 scans target electrode 19 along scan lines succeeding the scan lines upon which output voltages 82 and 83 were detected during the initial complete scan of the target electrode. Thus during the second scan of camera tube 10, only line clusters 86 and 88 of FIG. 4C are scanned to produce video signals 90 and 91 of FIG. 4D, respectively, and the magnitude of the initial video signal of each cluster is noted. Because point images 76 and 77 are charged down to cathode potential during the initial two scans of scan lines 86 and 88, no video signal is observable during the final line scan of line clusters 86 and 88. Amplified output voltages 90 and 91 produced during the selective scanning of FIG. 4C are detected by threshold detector 43 and after a delay of one frame plus one line, the output signal from the threshold detector actuates pulse generator 78 to again produce a positive going pulse, which pulse is applied through adder circuit 74 to the grid 21 of camera tube 10 to positively bias the grid for a period of one scan line. Thus a second selective scanning of camera tube 10 under the control of feedback circuit 14A is effectuated and line clusters 93 and 94, depicted in FIG. 4E, one line below the scan lines providing detectable video signals in the first selectively scan frame portrayed in FIG. 4C, are scanned. The magnitudes of video signals 95 and 96, depicted in FIG. 4F, produced by the selective scan of FIG. 4E are noted and compared with the magnitudes of the video signals produced during the prior scans. Point images 80 and 81 are assumed to be located along the scan lines producing the largest video signal for the respective point images.

The number of selected scans required to accurately locate each of the point images generally is dependent upon the degree of accuracy required with two selective scans being sufficient for most purposes. When a single selective scan is utilized to detect the location of point images 80 and 81, the delay interval of delay circuit 76 preferably is set equal to the sensing periphery of the electron beam. Thus for an electron beam having a sensing periphery of two scan lines, the delay interval of delay circuit 76 is set at one frame plus two scan lines. Divider circuit 72 is then altered to effectuate a 2 to 1 division rather than a 3 to 1 division and pulse generator 73 produces an output waveform having normal biasing and grid cutoff portions of equal period. A completely scanned frame then is alternated with a single selectively scanned frame which depicts the point images in enhanced intensity.

In television scanning systems wherein interlacing is utilized in the scan pattern, a field-to-field basis can be employed in the modification of the scan pattern by a suitable alteration in the period of delay circuit 76. Thus a first field could be scanned in a normal signal pattern and the second interlaced field could be selectively scanned in response to the detected output of the first field.

Similarly a frame-to-frame basis can be employed to modify an interlaced scanning pattern. Because a cluster of detectable signals is produced by the point images during each field of the normally scanned frame, the succeeding selectively scanned frame of an interlaced pattern effectuates two slightly diverse scannings of each point image. By comparing the magnitudes of the signals generated during each field of the selectively scanned frame, the location of the point image producing the signals can be ascertained.

While several examples of this invention have been shown and described, it will be apparent to those skilled in the art that many changes and modifications may be made without departing from this invention in its broader aspects; and therefore the appended claims are intended to cover all such changes and modifications as fall within the true spirit and scope of this invention.

What I claim as new and desire to secure by Letters Patent of the United States is:

1. A television scanning system comprising a camera tube having a target electrode, means for generating an electron beam and for directing said electron beam upon said target electrode, said target electrode absorbing charge from said electron beam and producing an output signal proportional to the luminance of an image formed upon said target electrode at the point of impingement of said electron beam, means for scanning said electron beam in a line pattern across said target electrode, means for detecting the output signal from said target electrode and means responsive to observance by said detection means of an output signal above a predetermined magnitude to alter the scan pattern of said electron beam, said altered scan pattern passing the centroid of the beam over said image producing said detected output signal.

2. A television scanning system according to claim 1 wherein said means for altering the scan pattern produces a deflection of said electron beam in an angular direction relative to the direction of said electron beam line scan.

3. A television scanning system according to claim 1 wherein said means for altering the scan pattern produces a beam deflection at the initiation of a scan line, said deflection distance being equal to a predetermined number of scan lines.

4. A television scanning system according to claim 1 wherein the location of a point image in a first scanned frame is stored to control the scan of a second frame.

5. A television scanning system according to claim 2 wherein said electron beam is deflected during the scan of a line.

6. In a television camera system wherein an output signal is produced by the scan of an electron beam in a line pattern across a target electrode to charge down said target electrode to cathode potential, the improvement comprising means for detecting the quantity of electrostatic charge absorbed from said electron beam by said target electrode and means responsive to observance of electrostatic charge absorption above a predetermined magnitude by said detecting means to alter the scan pattern of said electron beam.

References Cited

UNITED STATES PATENTS 3,350,505 10/1967 Bakis -------------- 178—6.8

RICHARD MURRAY, Examiner